(12) United States Patent
Liu et al.

(10) Patent No.: US 9,545,742 B2
(45) Date of Patent: Jan. 17, 2017

(54) MOLD AND METHOD FOR FORMING TILT BOSS

(71) Applicant: Quanta Computer Inc., Taoyuan Shien (TW)

(72) Inventors: Tsung-Chin Liu, New Taipei (TW); Ying-Huang Liu, Taipei (TW)

(73) Assignee: QUANTA COMPUTER, INC., Taoyuan (TW)

( * ) Notice: Subject to any disclaimer, the term of this patent is extended or adjusted under 35 U.S.C. 154(b) by 446 days.

(21) Appl. No.: 14/106,629

(22) Filed: Dec. 13, 2013

(65) Prior Publication Data

US 2014/0374957 A1    Dec. 25, 2014

(30) Foreign Application Priority Data

Jun. 24, 2013  (TW) .............................. 102122397 A

(51) Int. Cl.
*B29C 45/33*    (2006.01)
*B29C 45/40*    (2006.01)

(52) U.S. Cl.
CPC ........... *B29C 45/4005* (2013.01); *B29C 45/33* (2013.01)

(58) Field of Classification Search
USPC ........................................................ 425/457
See application file for complete search history.

(56) References Cited

FOREIGN PATENT DOCUMENTS

| CN | 2767124 Y | 3/2006 |
|---|---|---|
| CN | 201109171 Y | 9/2008 |
| CN | 201268067 Y | 7/2009 |
| CN | 202200469 U | 4/2012 |

*Primary Examiner* — Jacob Thomas Minskey
(74) *Attorney, Agent, or Firm* — McClure, Qualey & Rodack, LLP

(57) ABSTRACT

A mold for forming tilt boss includes a slider part, a main part and a core pin. The slider part is formed with a tilt groove. The main part is formed with a tilt channel. When the slider part and the first main part are engaged, a tilt-boss forming cavity is formed. The tilt-boss forming cavity is communicated with the tilt channel and coaxial with the tilt channel. The core pin penetrates the tilt channel and one distal portion thereof is slidably engaged with the tilt groove, another distal portion thereof is protruded into the tilt-boss forming cavity. When the slider part is separated from the main part for allowing the core pin to be moved from a high point to a low point of the tilt groove, the core pin is downwardly moved along the tilt channel.

7 Claims, 11 Drawing Sheets

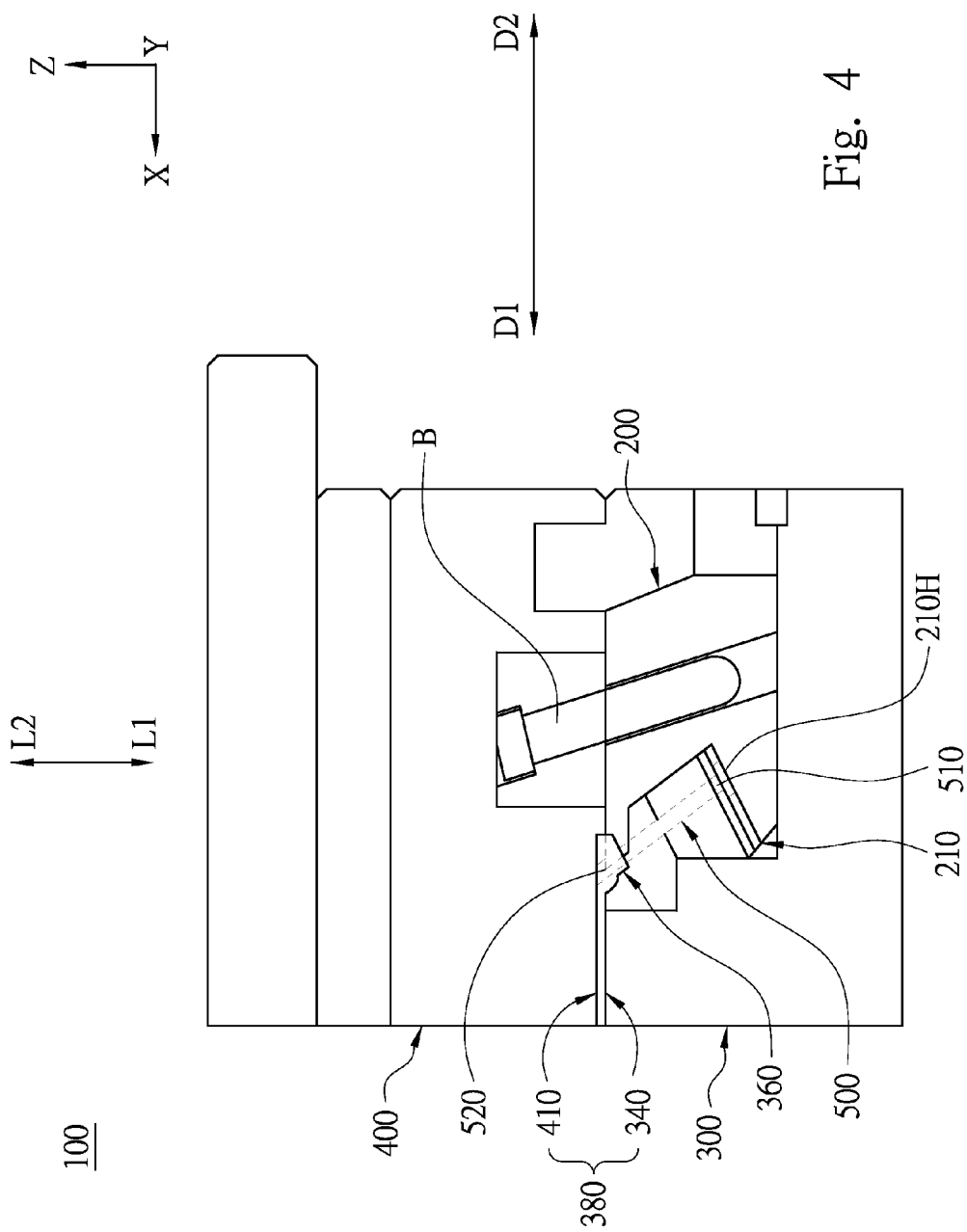

MOLD AND METHOD FOR FORMING TILT BOSS

CROSS-REFERENCE TO RELATED APPLICATIONS

This application claims priority to Taiwan Application Serial Number 102122397, filed Jun. 24, 2013, which is herein incorporated by reference.

FIELD OF THE INVENTION

The present disclosure relates to a mold. More particularly, the present disclosure relates to a mold and a method for forming tilt boss.

BACKGROUND

The housing of an electronic device is often formed with at least one boss which allows a screw to be locked therein. By the screw being locked in the boss, two housings can be combined and mutually locked.

However, as the electronic device being designed to be thinner and thinner, the vertical distance between the two combined housings for allowing the screw to be locked is obviously insufficient, and the inner longitudinal depth of the boss is also not deep enough, so as to affect the locking force between the two combined housings. As such, the skilled people in the art have developed a design of making the boss to be tilted for expanding the inner longitudinal depth.

However, because the boss is formed on the housing with a tilt manner, the mold for forming tilt boss cannot be processed with the vertical mold releasing, so that a novel mold design is required for achieving the required structure.

SUMMARY

The disclosure provides a mold and a method for forming tilt boss for solving the mentioned disadvantages existed in prior art.

According to one embodiment of the present disclosure, the mold for forming tilt boss includes a slider part, a first main part and a core pin. The slider part is formed with a tilt groove, the tilt groove is defined with a high point and a low point having a height differentiation formed therebetween. The first main part is moveably engaged with the slider part and is formed with a tilt channel. When the slider part and the first main part are engaged, a tilt-boss forming cavity is formed between the slider part and the first main part, the tilt-boss forming cavity is coaxial with the tilt channel and communicated with the tilt channel. The core pin is allowed to penetrate the tilt channel and formed with a first distal portion and a second distal portion opposite to the first distal portion. The first distal portion is slidably engaged with the tilt groove. The second distal portion is protruded into the tilt-boss forming cavity.

Therefore, when the slider part is separated from the first main part for allowing the first distal portion of the core pin to be moved from the high point to the low point defined in the tilt groove, the core pin is downwardly moved along the tilt channel.

According to another embodiment of the present disclosure, the method for forming tilt boss including following steps. The slider part, the first main part and a second main part are engaged together, and a liquid plastic material is injected into the tilt-boss forming cavity so as to allow a tilt-boss to be formed in the tilt-boss forming cavity; the slider part is separated from the first main part so as to allow the first distal portion of the core pin to be moved from the high point to the low point of the tilt groove and downwardly moved along the tilt channel; and the tilt boss is removed from the first main part.

As what has been disclosed above, with the mold for forming tilt boss provided by the present disclosure, when the slider part is separated from the first main part, the core pin is enabled to be separated from the injection-formed tilt boss through the movement of the slider part, the mold is prevented from interfering the vertical mold releasing processed to the tilt boss, thereby simplifying the mold design and shortening the production time.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 4 is a schematic view illustrating the slider part, the first main part and the second main part of the mold for forming tilt boss being engaged according to the present disclosure;

DETAILED DESCRIPTION

The spirit of the disclosure will be described clearly through the drawings and the detailed description as follows. Any of those of ordinary skills in the art can make modifications and variations from the technology taught in the disclosure after understanding the embodiments of the disclosure, without departing from the sprite and scope of the disclosure.

Because of the tilt extending characteristic of a tile boss formed by a conventional mold, the tilt boss would be interfered by the conventional mold during mold releasing thereby being unable to be removed. Thus, the present disclosure provides a mold and a method for forming tilt boss, a core pin used for assisting the formation of the tilt boss can be timely retracted out of the tilt boss, thereby preventing the tilt boss from being interfered during mold releasing so as to simplify the mold design and shorten the production time.

Figure 1:
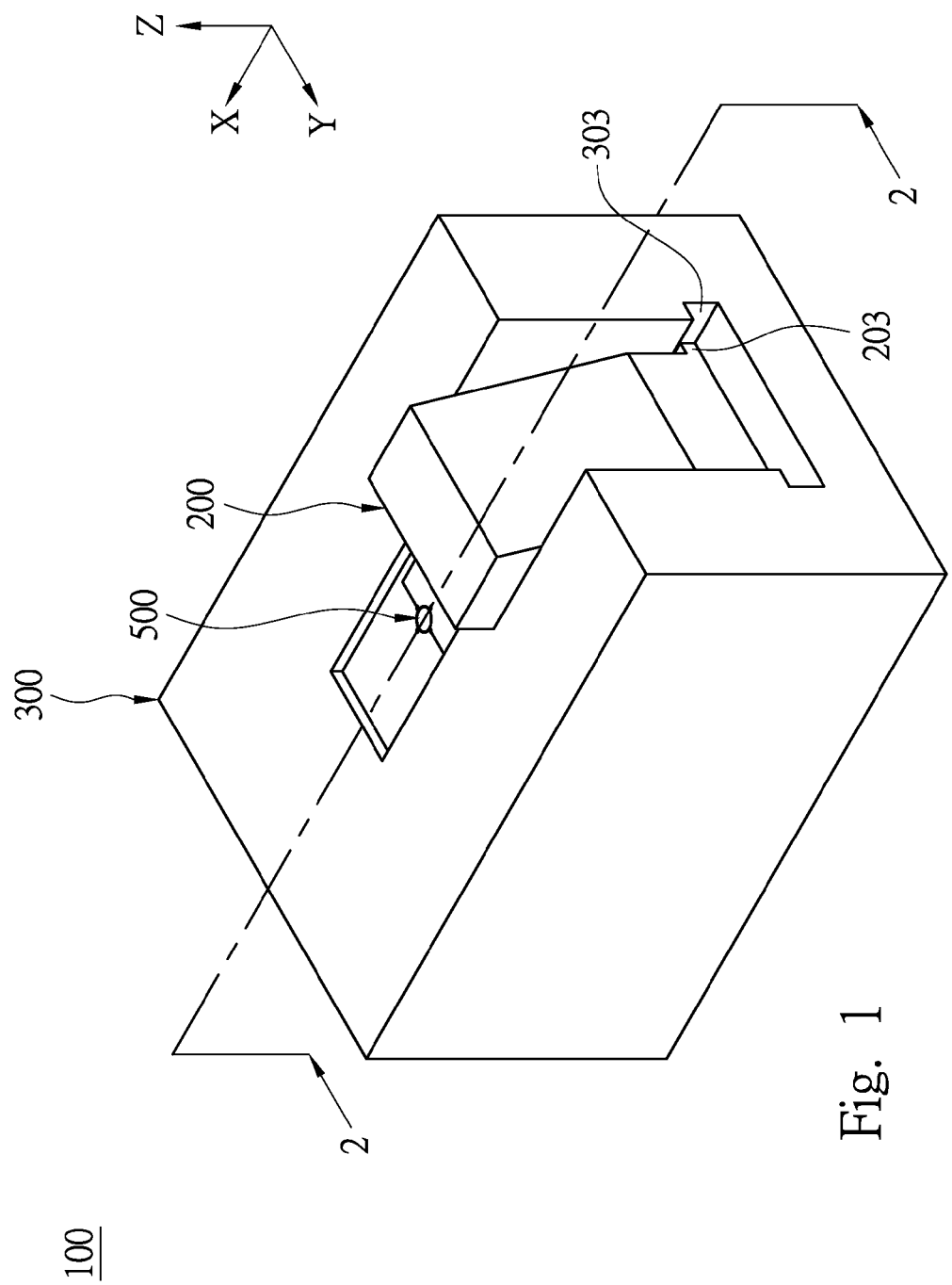
FIG. 1 is a schematic view showing the slider part and the first main part of the mold for forming tilt boss being engaged according to the present disclosure.
Figure 2A:
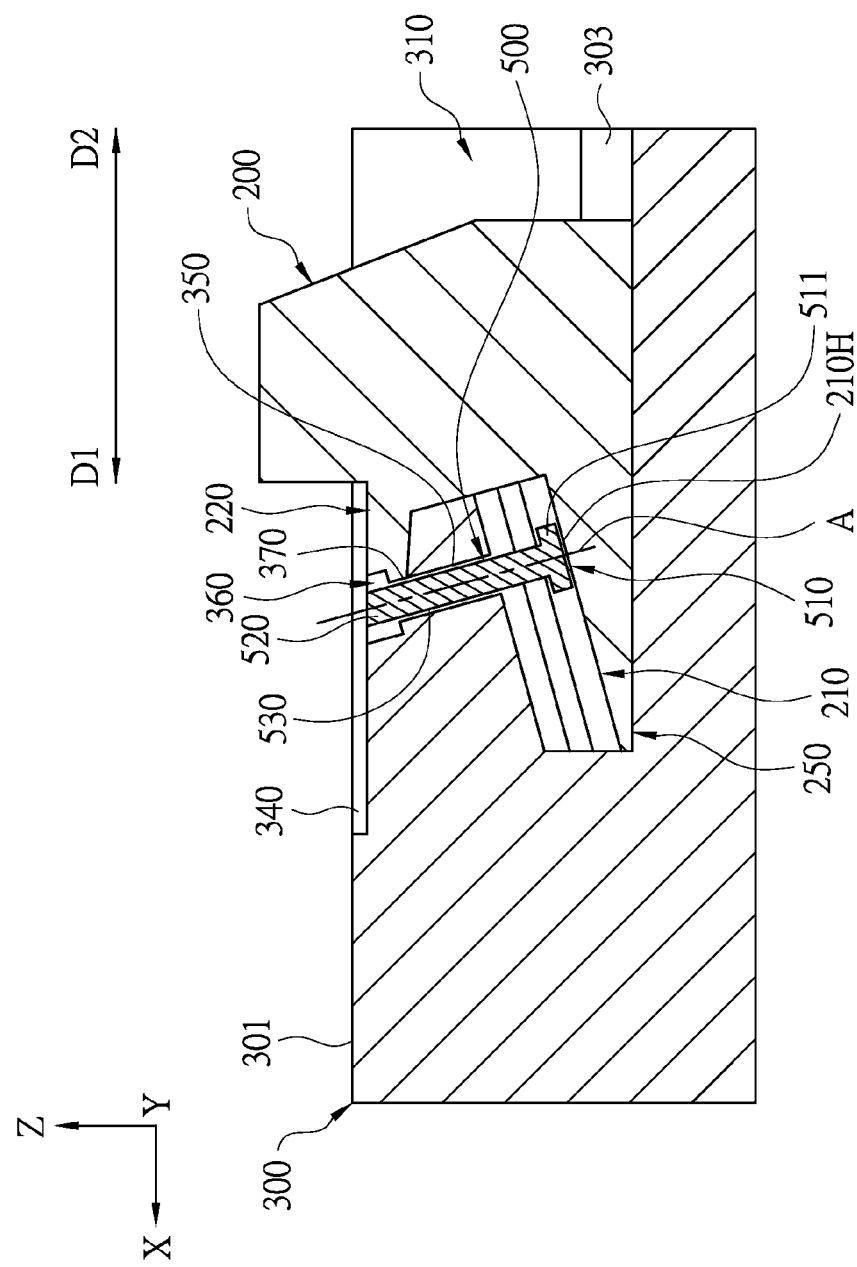
FIG. 2A is a cross sectional view of FIG. 1 taken along 2-2.

Reference is now made to FIG. 1 and FIG. 2A. FIG. 1 is a schematic view showing the slider part 200 and the first main part 300 of the mold 100 for forming tilt boss being engaged according to the present disclosure, and FIG. 2A is a cross sectional view of FIG. 1 taken along 2-2.

As shown in FIG. 1 and FIG. 2A, the mold 100 for forming tilt boss includes a slider part 200, a first main part 300 (e.g., a male mold) and a core pin 500. The slider part 200 can be moveably engaged with the first main part 300. For example, the slider part 200 is engaged with the first main part 300 along a first sliding direction D1 (e.g., +X axle), or separated from the first main part 300 along a second sliding direction D2 (e.g., −X axle) opposite to the first sliding direction D1. The first main part 300 in formed with a tilt channel 350. The long axial direction of the tile channel 350 is not parallel to the first sliding direction D1, and not perpendicular to the first sliding direction D1. The slider part 200 is formed with a tilt groove 210 thereon. The long axial direction of the tile groove 210 is not parallel to the first sliding direction D1, and not perpendicular to the first sliding direction D1.

As shown in FIG. 2A, when the slider part 200 is engaged with the first main part 300 along the first sliding direction D1, a tilt-boss forming cavity 360 is formed between the slider part 200 and the first main part 300, the tilt-boss forming cavity 360 and the tilt channel 350 have a common imaginary axial core A (i.e., the tilt-boss forming cavity 360 and the tilt channel 350 are coaxial), and the tilt-boss forming cavity 360 is communicated with the tilt channel 350, the imaginary axial core A passes through the tilt groove 210. In addition, the diameter of the tilt-boss forming cavity 360 is greater than the diameter of the tilt channel 350.

The core pin 500 is slidably disposed in the slider part 200 and the first main part 300. Substantially, the core pin 500 formed as a linear column, passes through the tilt channel 350, and the core pin 500 is formed with a first distal portion 510 and a second distal portion 520 opposite to the first distal portion 510, and a middle portion 530 is defined between the first distal portion 510 and the second distal portion 520. The middle portion 530 is formed in the tilt channel 350. The first distal portion 510 is slidably disposed in the tilt groove 210, e.g., the first distal portion 510 of the core pin 500 is formed with an engaging portion 511, the engaging portion 511 is formed with, for example, a T-shaped cross section, and is slidably engaged in the tilt groove 210 so as to slide along the tilt groove 210 only. The second distal portion 520 protrudes from the tilt channel 350 and enters the tilt-boss forming cavity 360, and the second distal portion 520 is completely not in physically contact with the inner wall of the tilt-boss forming cavity 360, i.e., a gap is formed between the inner wall of the tilt-boss forming cavity 360 and the outer wall of the second distal portion 520 of the core pin 500 received in the tilt-boss forming cavity 360.

Figure 2B:
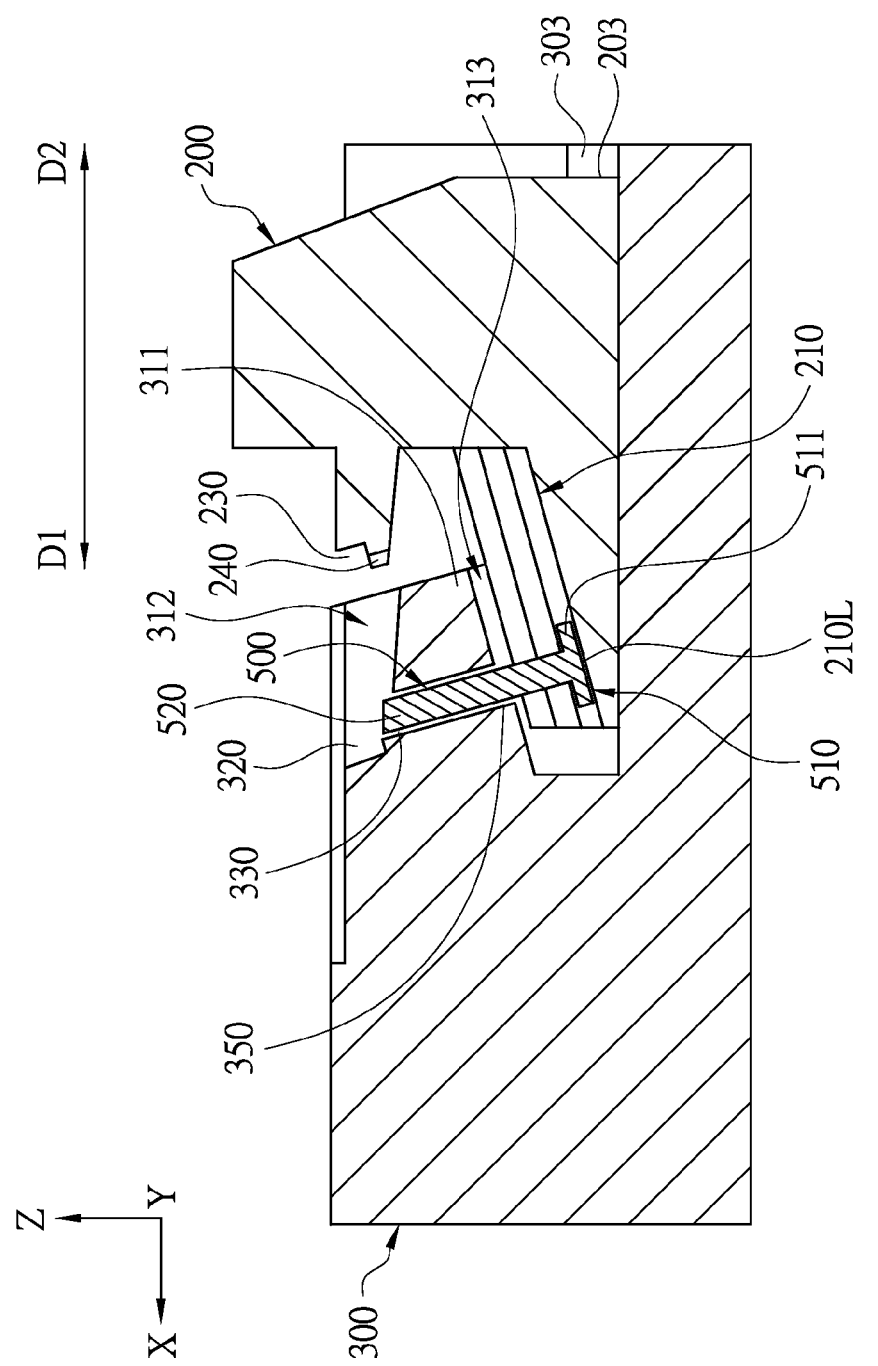
FIG. 2B is a cross sectional view illustrating the slider part and the first main part of FIG.1 being separated, wherein the crossed location being the same as FIG. 2A.

As shown in FIG. 2B, FIG. 2B is a cross sectional view illustrating the slider part 200 and the first main part 300 of FIG.1 being separated, wherein the crossed location being the same as FIG. 2A.

When the slider part 200 is moved along the second sliding direction D2 for being separated from the first main part 300, the transversal (e.g., X axle) displacement of the core pin 500 is restrained through the tilt channel 350 of the first main part 300, so the core pin 500 is unable to move with the slider part 200 along the second sliding direction D2, the first distal portion 510 of the core pin 500 is only allowed to move from a high point 210H (FIG. 2A) defined in the tilt groove 210 to a low point 210L (FIG. 2B) defined in the tilt groove 210, wherein a Z axle differentiation is defined between the high point 210H and the low point 210L. In the meanwhile, the core pin 500 is downwardly moved along the tilt channel 350, i.e., the second distal portion 520 of the core pin 500 is partially retracted into the tilt channel 350. Wherein, it is well known by the skilled people in the art that the second distal portion 520 of the core pin 500 can be fully retracted into the tilt channel 350.

Figure 3A:
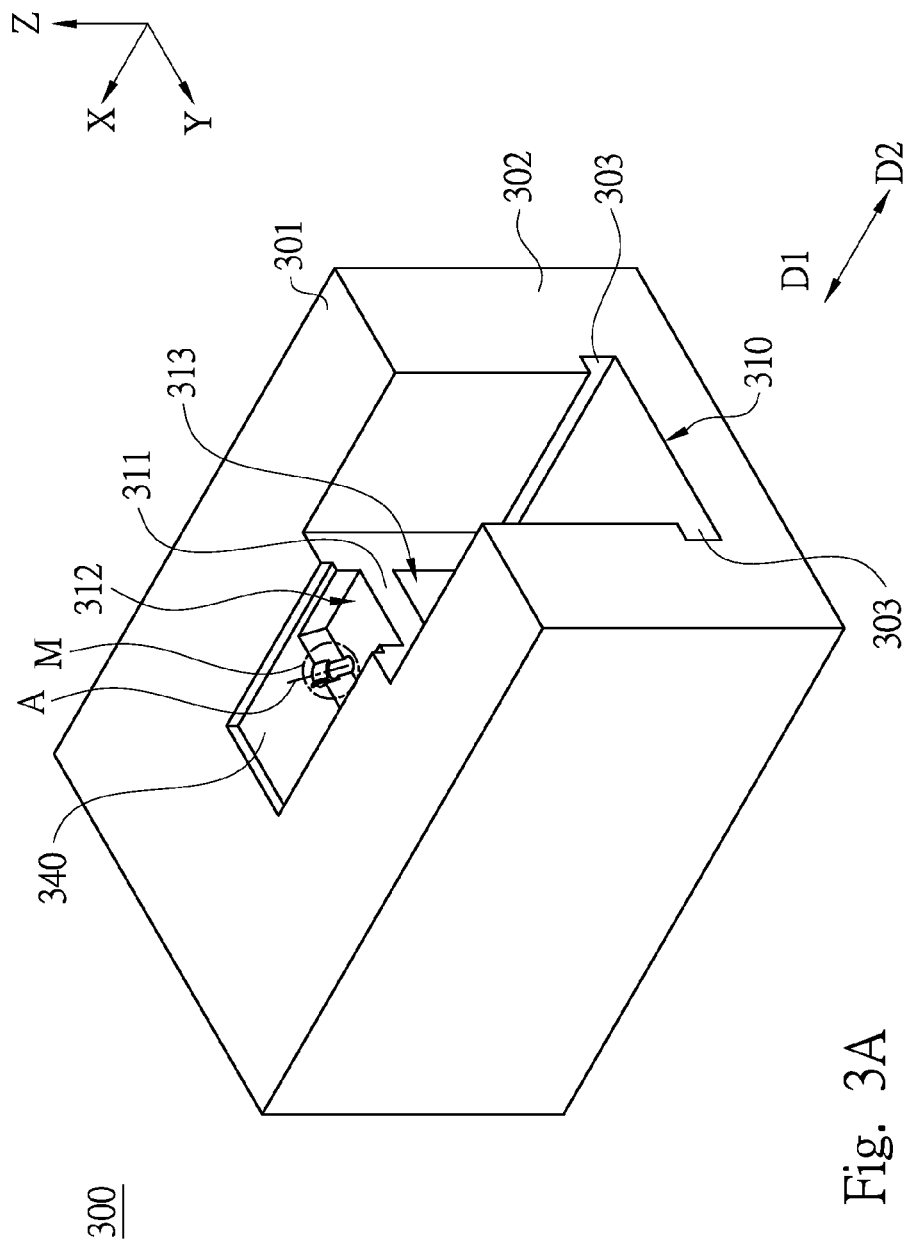
FIG. 3A is a perspective view showing the first main part of FIG. 1.

FIG. 3A is a perspective view showing the first main part 300 of FIG. 1. As shown in FIG. 2A and FIG. 3A, the first main part 300 is formed with an accommodation slot 310, the accommodation slot 310 is formed on a first top surface 301 and a first lateral surface 302 of the first main part 300, the first top surface 301 is adjacent to the first lateral surface 302.

Figure 3B:
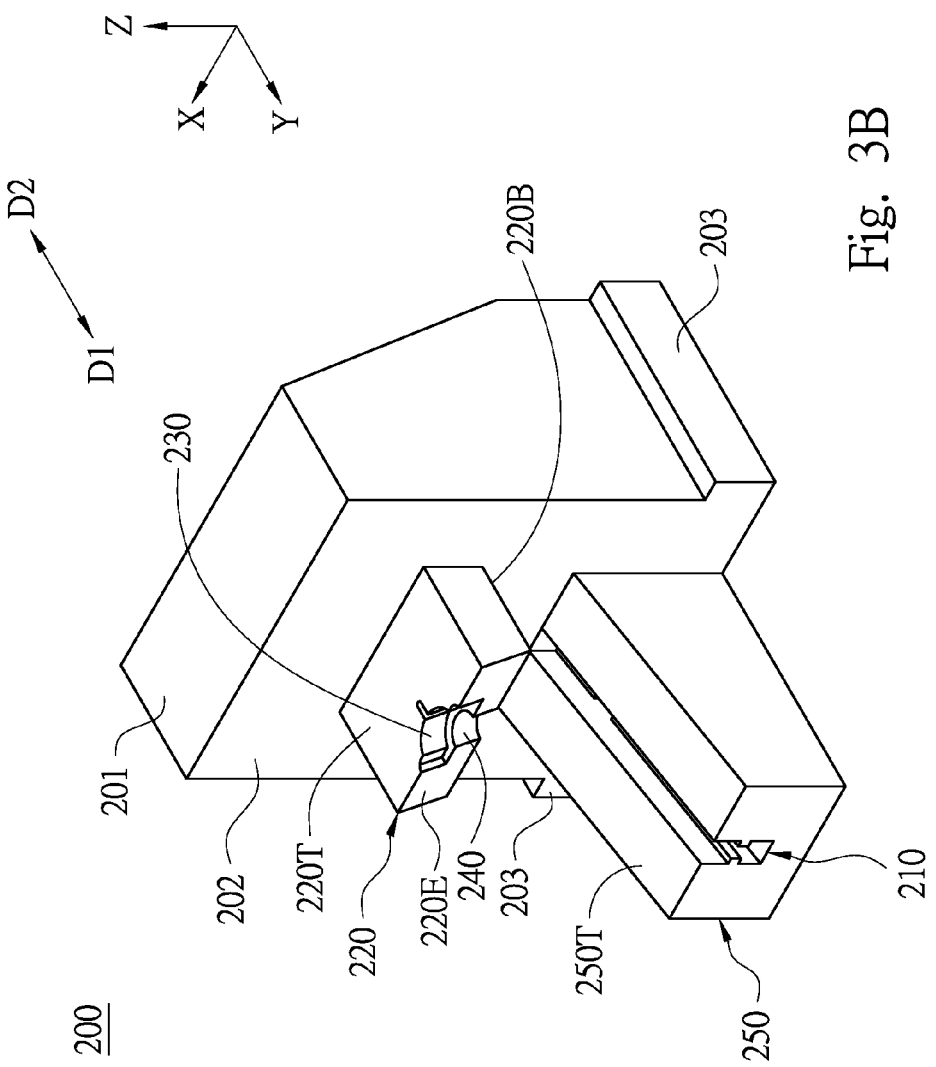
FIG. 3B is a perspective view showing the slider part of FIG. 1.

FIG. 3B is a perspective view showing the slider part 200 of FIG. 1. As shown in FIG. 3A and FIG. 3B, the accommodation slot 310 is formed with two first guide members 303 (e.g., concave grooves) which are oppositely arranged. The slider part 200 is formed with two second guide members 203 (e.g., convex strips) which are oppositely arranged with each other. The long axial direction (e.g., X axle) of the first guide members 303 and the long axial direction (e.g., X axle) of the second guide members 203 are parallel to the first sliding direction D1 or the second sliding direction D2. The locations and the appearances of the first guide members 303 are respectively matched with the locations and the appearances of the second guide members 203, and the first guide members 303 can be respectively and slidably engaged with the second guide members 203.

Thus, as shown in FIG. 2A and FIG. 2B, through the first guide members 303 sliding on the second guide members 203, the slider part 200 can reciprocally move along the first sliding direction D1 or the second sliding direction D2 in a smoother manner.

In addition, as shown in FIG. 2B and FIG. 3A, the first main part 300 is further formed with a partition member 311, a first concave portion 312 and a second concave portion 313. The partition member 311, the first concave portion 312 and the second concave portion 313 are formed in the accommodation slot 310, and the partition member 311 is disposed between the first concave portion 312 and the second concave portion 313, the tilt channel 350 penetrates the partition member 311 and is communicated with the first concave portion 312 and the second concave portion 313. As shown in FIG. 3A, the first concave portion 312 and the second concave portion 313 are respectively arranged at two opposite sides of the partition member 311 and communicated with the accommodation slot 310.

As shown in FIG. 3B, the slider part 200 is further formed with a first convex portion 220 and a second convex portion 250 arranged with an interval. The first convex portion 220 and the second convex portion 250 are formed on a second lateral surface 202 of the slider part 200, and both protruded from the second lateral surface 202 towards the same direction (e.g., D1). The tilt groove 210 is formed on a top surface 250T of the second convex portion 250 thereby allowing the core pin 250 to linearly move along the same direction.

Therefore, when the slider part 200 is received in the accommodation slot 310 (as shown in FIG. 2A), the first convex portion 220 is received in the first concave portion 312, and the second convex portion 250 is received in the second concave portion 313.

Figure 3C:
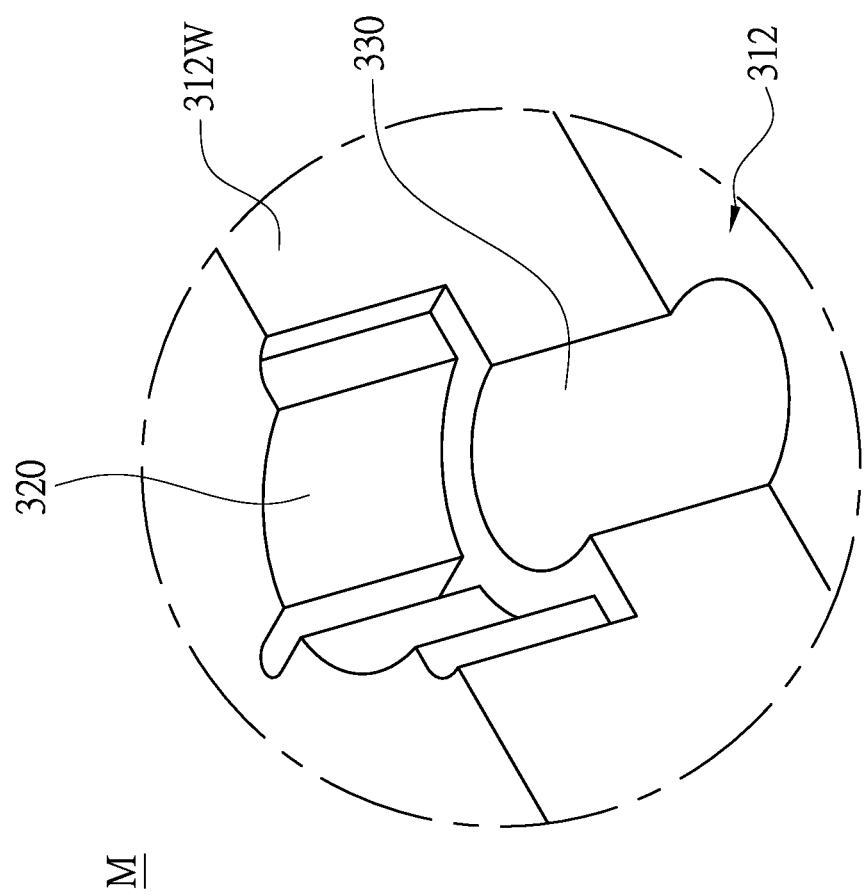
FIG. 3C is a partially enlarged view showing the zone M of FIG. 3A.

FIG. 3C is a partially enlarged view showing the zone M of FIG. 3A. As shown in FIG. 3A and FIG. 3C, the first main part 300 is further formed with a first recess portion 320 and a second recess portion 330. The first recess portion 320 and the second recess portion 330 are both formed on the same inner wall 312W of the first concave portion 312, and the second recess portion 330 is communicated with the first recess portion 320. The first recess portion 320 and the second recess portion 330 are both formed in a substantial semi-circular status, but the diameter of the second recess portion 330 is smaller than the diameter of the first recess portion 320.

As shown in FIG. 3B, the slider part 200 is further formed with a third recess portion 230 and a fourth recess portion 240. The third recess portion 230 is formed an end surface 220E and a top surface 220T of the first convex portion 220. The fourth recess portion 240 is formed on the end surface 220E and a bottom surface 220B of the first convex portion 220, wherein the bottom surface 220B is opposite to the top surface 220T. The fourth recess portion 240 is communicated with the third recess portion 230, the third recess portion 230 and the fourth recess portion 240 are both formed in a substantial semi-circular status, but the diameter of the fourth recess portion 240 is smaller than the diameter of the third recess portion 230.

As shown in FIG. 2A and FIG. 3C, when the slider part 200 is received in the accommodation slot 310, the first convex portion 220 is received in the first concave portion 312, and the second convex portion 250 is received in the second concave portion 313, at this moment, the end surface 220E of the first convex portion 220 is tightly attached to the inner wall 312W of the first concave portion 312 (as shown in FIG. 1), thus, the first recess portion 320 and the third recess portion 330 jointly form the mentioned tilt-boss forming cavity 360 (as shown in FIG. 2A), and the second recess portion 330 and the fourth recess portion 240 jointly form a coaxial channel 370 (as shown in FIG. 2A). In addition, the coaxial channel 370 is coaxial with the tilt-boss forming cavity 360 and the tilt channel 350, and communicated between the tilt-boss forming cavity 360 and the tilt channel 350.

Thus, as shown in FIG. 2B, when the slider part 200 is moved along the second sliding direction D2, the second convex portion 250 can be retraced from the second concave portion 313, so the first distal portion 510 of the core pin 500 is moved to the low point 210L defined in the tilt groove 210, and the second distal portion 520 of the core pin 500 is retracted into the second recess portion 330 (as shown in FIG. 3C).

As shown in FIG. 3A, the first main part 300 is further formed with a first mold cavity 340 thereon, the first mold cavity 340 is formed on the first top surface 301 and the first lateral surface 302 of the first main part 300, and is communicated with the first concave portion 312, the first recess portion 320 and the second recess portion 330. The two dimensional area of the first mold cavity 340 is greater than the two dimensional area of the first concave portion 312. The long axial direction (e.g., X axle) or the short axial direction (e.g., Y axle) of the two dimensional area of the first mold cavity 340 is not perpendicular to the axial direction (e.g., the imaginary axial core A) of the tilt-boss forming cavity 360, so the axial direction (e.g., the imaginary axial core A) of the tilt-boss forming cavity 360 is tilted relative to the two dimensional plane of the first mold cavity 340.

FIG. 4 is a schematic view illustrating the slider part 200, the first main part 300 and the second main part 400 of the mold 100 for forming tilt boss being engaged according to the present disclosure.

As shown in FIG. 4, the mold 100 further includes a second main part 400 (e.g., a female mold). The second main part 400 is engaged with the slider part 200 and the first main part 300 with an ascending/descending manner. For example, the second main part 400 is moved to cover on the first top surface 301 of the first main part 300 and the second top surface 201 of the slider part 200 along a descending direction L1 (e.g., −Z axle); or is away from the first top surface 301 of the first main part 300 and the second top surface 201 of the slider part 200 along an ascending direction L2 (e.g., +Z axle) opposite to the descending direction L1. The second main part 400 is further formed with a second mold cavity 410, and the second mold cavity 400 is formed on one surface of the second main part 400.

When the slider part 200 is engaged with the first main part 300, and the second main part 400 is engaged with the slider part 200 and the first main part 300 along the descending direction L1, the first mold cavity 340 and the second mold cavity 410 jointly define a forming cavity 380 between the first main part 300, the second main part 400 and the slider part 200, and the forming cavity 380 is communicated with the tilt-boss forming cavity 360 jointly defined by the first main part 300 and the slider part 200.

Figure 5:
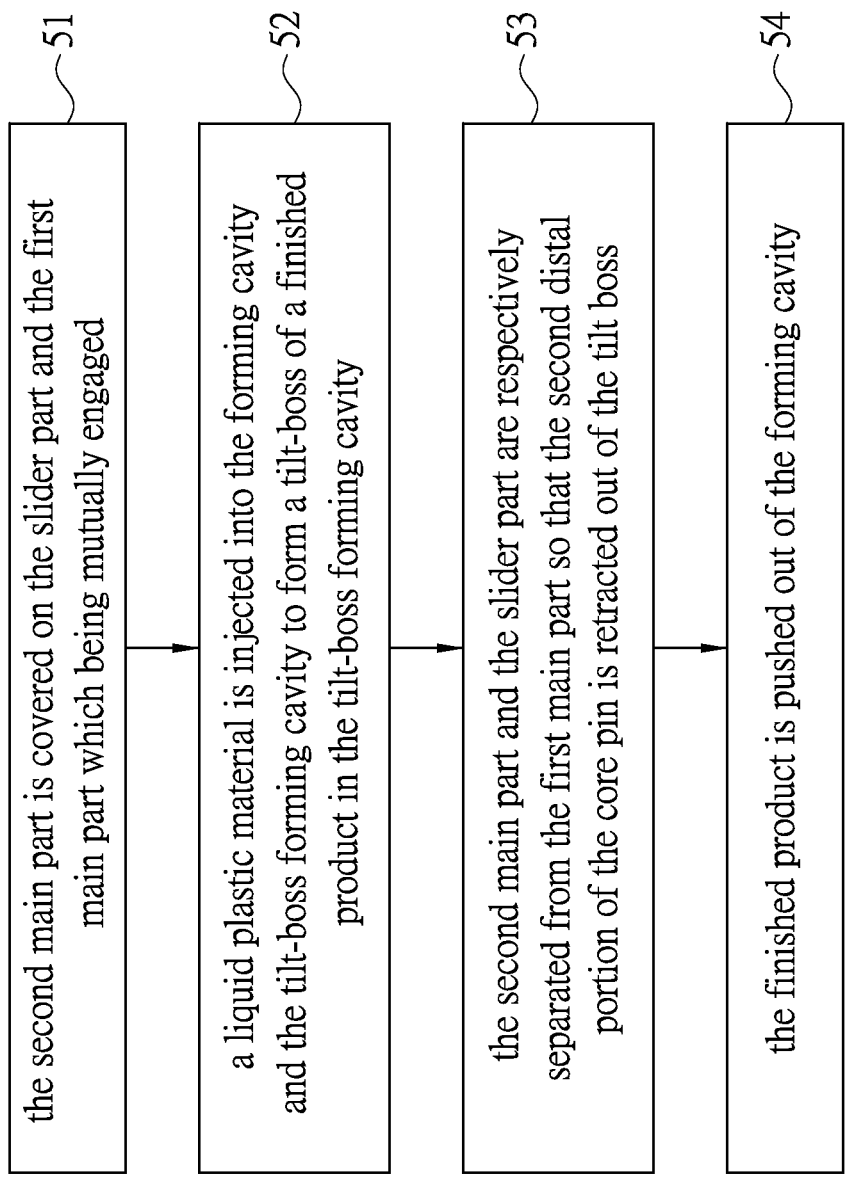
FIG. 5 is a flowchart illustrating the method for forming tilt boss according to the present disclosure.

FIG. 5 is a flowchart illustrating the method for forming tilt boss according to the present disclosure. As shown in FIG. 5, the method for forming tilt-boss provided by the present disclosure includes the following steps as outline. In STEP (51), the second main part is covered on the slider part and the first main part which being mutually engaged; in STEP (52), a liquid (melted) plastic material is injected into the forming cavity and the tilt-boss forming cavity to form a tilt-boss of a finished product in the tilt-boss forming cavity; in STEP (53), the second main part and the slider part are respectively separated from the first main part so that the second distal portion of the core pin is retracted out of the tilt boss; and in STEP (54), the finished product is pushed out of the forming cavity.

As shown in FIG. 4, in the STEP (51), the slider part 200 is moved along the first sliding direction D1 for engaging with the first main part 300, then the second main part 400 is moved along the descending direction L1 for covering on one side of the slider part 200 and the first main part 300, the second main part 400 is tightly engaged with the slider part 200 by utilizing a bolt B, so that the forming cavity 380 and the tilt-boss forming cavity 360 are formed between the first main part 300, the second main part 400 and the slider part 200.

At this moment, after the slider part 200 is moved along the first sliding direction D1 to engage with the first main part 300, the first distal portion 510 of the core pin 500 is moved to the high point 210H defined in the tilt groove 210, thus, the second distal portion 520 of the core pin 500 can be protruded into the tilt-boss forming cavity 360.

Figure 6:
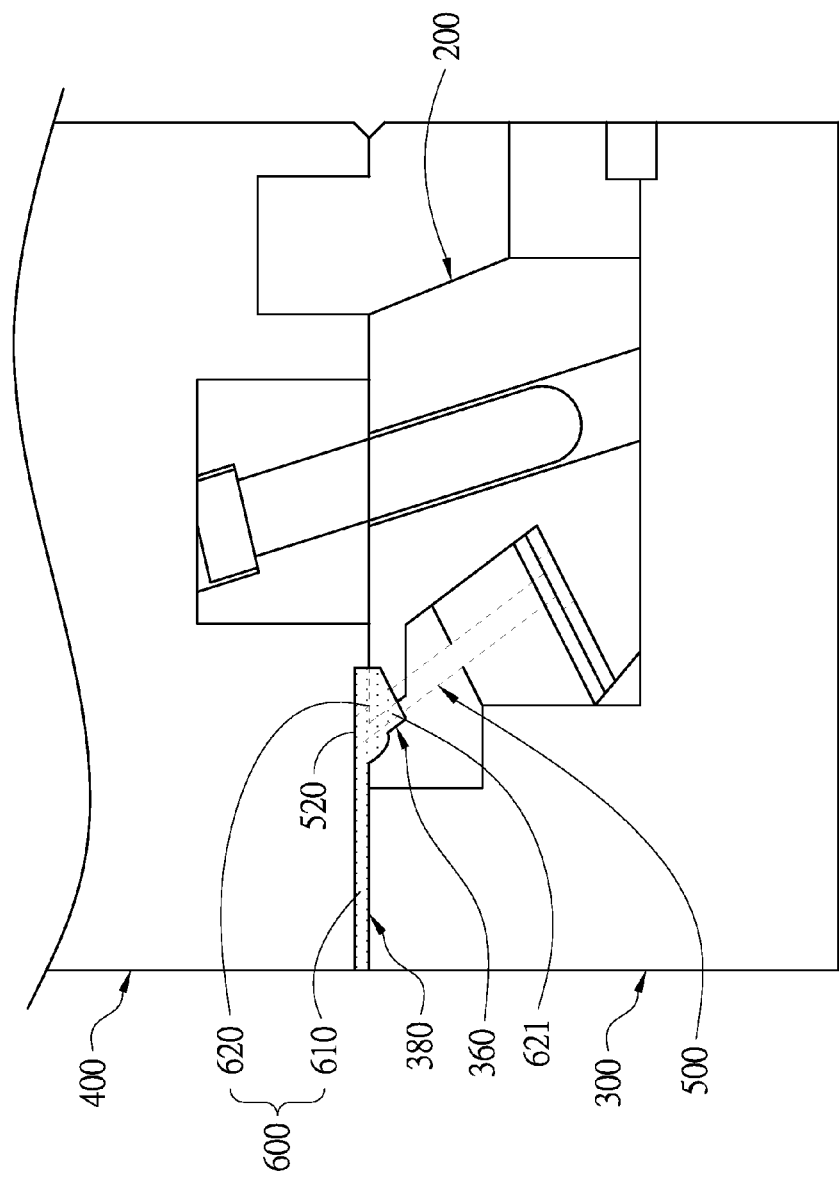
FIG. 6 is a schematic view illustrating a liquid plastic material being injected into the mold for forming tilt boss according to the present disclosure.

In the STEP (52), as shown in FIG. 6, when the liquid plastic material is injected into the forming cavity 380, a part of the liquid plastic material flows into the tilt-boss forming cavity 360.

FIG. 6 is a schematic view illustrating a liquid plastic material being injected into the mold 100 for forming tilt boss according to the present disclosure.

As shown in FIG. 5 and FIG. 6, because the liquid plastic material is fully filled in the forming cavity 380 and the tilt-boss forming cavity 360, a housing 610 of a finished product 600 is formed in the forming cavity 380, a tilt boss 620 of the finished product 600 is formed in the tilt-boss forming cavity 360.

Because the second distal portion 520 of the core pin 500 received in the tilt-boss forming cavity 360 is completely not in physically contact with the inner wall of the tilt-boss forming cavity 360, the liquid plastic material is allowed to be filled in the gap defined between the second distal portion 520 of the core pin 500 and the inner wall of the tilt-boss forming cavity 360, and the second distal portion 520 of the core pin 500 is received in the tilt-boss forming cavity 360, so a chamber 621 is correspondingly formed in the tilt boss 620 after the second distal portion 520 of the core pin 500 retracts out of the tilt-boss forming cavity 360.

Figure 7:
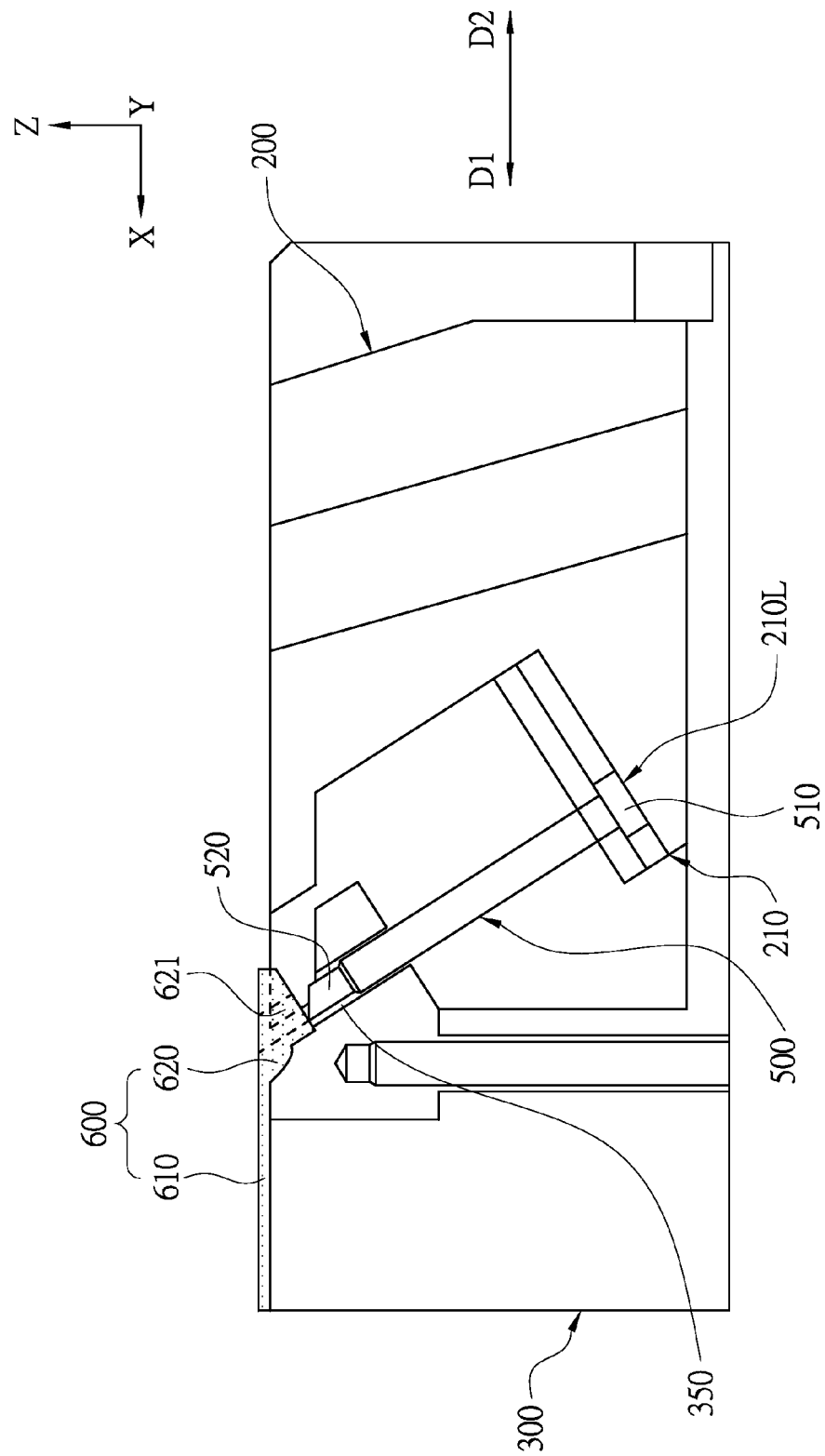
FIG. 7 is a schematic view illustrating the slider part and the first main part of the mold for forming tilt boss being separated according to the present disclosure.

FIG. 7 is a schematic view illustrating the slider part 200 and the first main part 300 of the mold 100 for forming tilt boss being separated according to the present disclosure. As shown in FIG. 4 and FIG. 7, in the STEP (53), when the second main part 400 is moved along the ascending direction L2 for separating from the slider part 200 and the first main part 300, and the slider part 200 is moved along the second sliding direction D2 for separating from the first main part 300, the core pin 500 is received in the tilt channel 350 and the transversal displacement thereof is restrained by the inner wall of the tilt channel 350, so the core pin 500 is unable to be moved with the slider part 200, the first distal portion 510 of the core pin 500 is moved to the low point 210L defined in the tilt groove 210, the second distal portion 520 of the core pin 500 is retracted out of the chamber 621 of the tilt boss 620, and into the second recess portion 330 (as shown in FIG. 3C).

Figure 8:
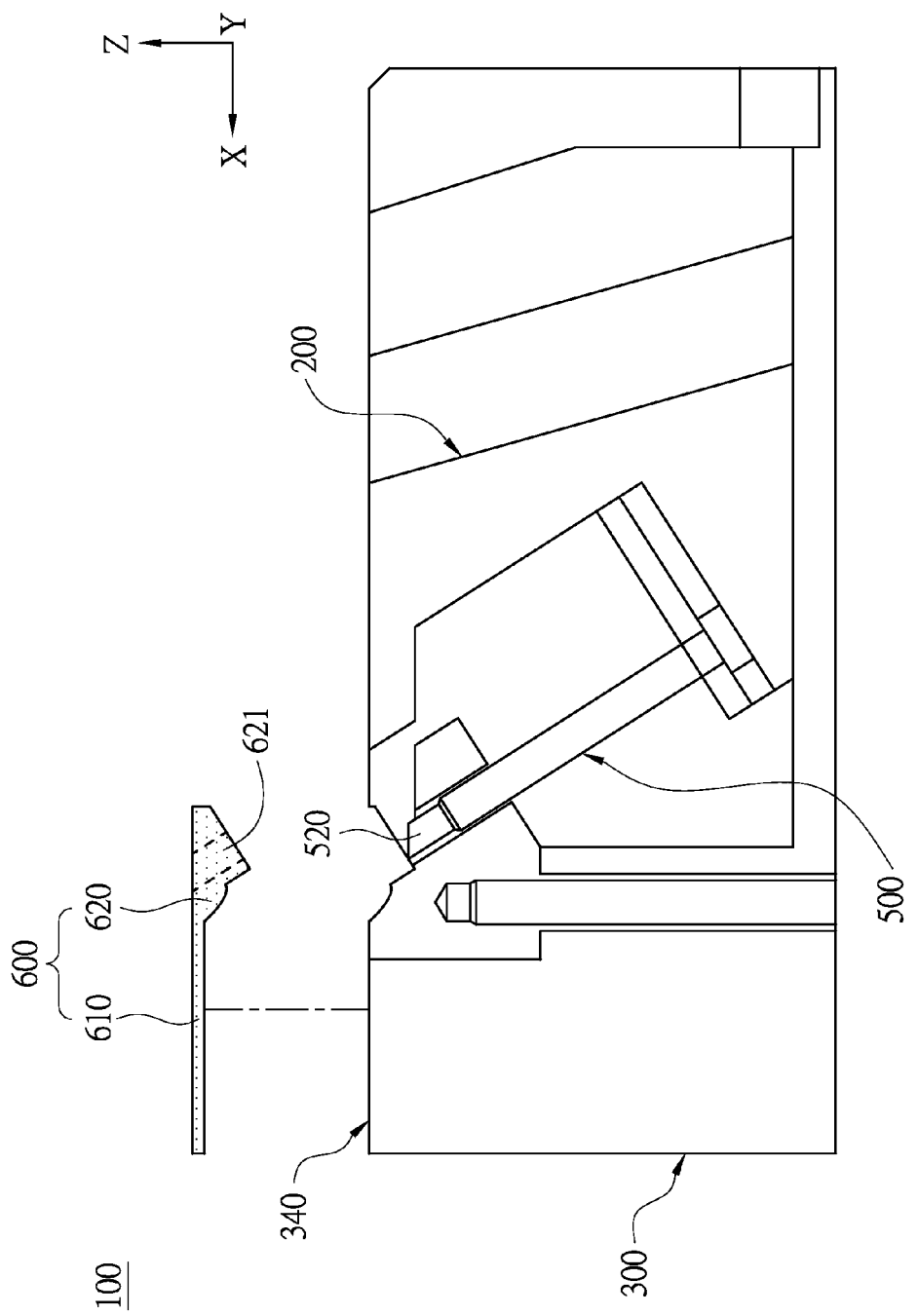
FIG. 8 is a schematic view illustrating a tilt boss being retracted from the first main part.

FIG. 8 is a schematic view illustrating a tilt boss being retracted out of the first main part 300. As shown in FIG. 8, in the STEP (54), a mold releasing tool (not shown in figures) is used for pushing the finished product 600 out of the first mold cavity 340. Due to the movement of the slider part 200, the second distal portion 520 of the core pin 500 is enabled to be retracted out of the chamber 621 of the tilt boss 620, so when the finished product 600 is vertically linked (e.g., along the Z axle), the tilt boss 620 is prevented from being interfered by the mold 100 thereby allowing to be smoothly separated from the mold 100.

Moreover, it is well known by the skilled people in the art that the shape or accessory required by the tilt boss can be reflected to the tilt-boss forming cavity, for example four side ribs are formed at the outer periphery of the tilt boss. However, the scope of the present disclosure is not limited by the mentioned arrangement.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A mold for forming tilt boss, comprising:
   a slider part formed with a first convex portion, a second convex portion and a tilt groove formed on a top surface of the second convex portion, wherein the first convex portion and the second convex portion are protruded towards the same direction, and the tilt groove is defined with a low point and a high point, and a height differentiation is formed between the low point and the high point;
   a first main part moveably engaged with the slider part, and formed with an accommodation slot, a partition member, a first concave portion, a second concave portion and a tilt channel, the partition member disposed between the first concave portion and the second concave portion, and the tilt channel penetrating the partition member, and the tilt channel being communicated with the first concave portion and the second concave portion, and the slider part slidably engaged in the accommodation slot, wherein a tilt-boss forming cavity is formed when the slider part and the first main part are engaged, the tilt-boss forming cavity is coaxial with the tilt channel and communicated with the tilt channel; and
   a core pin penetrated through the tilt channel, and the core pin comprising:
   a first distal portion slidably engaged with the tilt groove; and
   a second distal portion being opposite to the first distal portion, and protruded into the tilt-boss forming cavity,
   wherein, when the slider part is engaged with the first main part, the first convex portion is received in the first concave portion, and the second convex portion is received in the second concave portion; and
   when the slider part is separated from the first main part such that the first distal portion of the core pin moves from the high point to the low point of the tilt groove, the core pin is downwardly moved along the tilt channel.

2. The mold for forming tilt boss according to claim 1, wherein the second distal portion received in the tilt-boss forming cavity is completely not in physically contact with the inner wall of the tilt-boss forming cavity.

3. The mold for forming tilt boss according to claim 1, wherein a diameter of the tilt-boss forming cavity is greater than a diameter of the tilt channel.

4. The mold for forming tilt boss according to claim 1, wherein the accommodation slot is formed with at least one first guide member, the slider part is formed with at least one second guide member, the first guide member is matched with the second guide member, and slidably engaged with the second guide member.

5. The mold for forming tilt boss according to claim 1, wherein the first main part comprising:
   a first recess portion formed on an inner wall of the first concave portion; and
   a second recess portion formed on the inner wall of the first concave portion, and communicated with the first recess portion, and a diameter of the second recess portion is smaller than a diameter of the first recess portion; and
   the slider part comprising:
   a third recess portion formed on an end surface of the first convex portion; and a fourth recess portion formed on the end surface of the first convex portion, and communicated with the third recess portion, and a diameter of the fourth recess portion is smaller than a diameter of the third recess portion, wherein, when the slider part is engaged with the first main part, the first recess portion and the third recess portion jointly form the tilt-boss forming cavity, and the second recess portion and the fourth recess portion jointly form a coaxial channel, the coaxial channel is coaxial with the tilt-boss forming cavity and the tilt channel, and communicated between the tilt-boss forming cavity and the tilt channel.

6. The mold for forming tilt boss according to claim 1, further comprising a second main part, the first main part is formed with a first mold cavity, the second main part is formed with a second mold cavity, wherein, when the slider part is engaged with the first main part, and the second main part is engaged with the slider part and the first main part, the first mold cavity and the second mold cavity jointly define a forming cavity between the first main part, the second main part and the slider part, and the forming cavity is communicated with the tilt-boss forming cavity.

7. The mold for forming tilt boss according to claim 1, wherein the first distal portion of the core pin is formed with an engaging portion, the engaging portion is movably restrained in the tilt groove.

\* \* \* \* \*